United States Patent
Kwak et al.

(10) Patent No.: US 7,858,265 B2
(45) Date of Patent: Dec. 28, 2010

(54) CARRIER FOR FUEL CELL, AND CATALYST, MEMBRANE-ELECTRODE ASSEMBLY, AND FUEL CELL SYSTEM INCLUDING THE SAME

(75) Inventors: Chan Kwak, Suwon-si (KR); Alexey Alexandrovichserov, Suwon-si (KR); Soon-Ki Kang, Suwon-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 205 days.

(21) Appl. No.: 12/216,369

(22) Filed: Jul. 2, 2008

(65) Prior Publication Data
US 2009/0104509 A1    Apr. 23, 2009

(30) Foreign Application Priority Data
Oct. 18, 2007    (KR) .................. 10-2007-0105129

(51) Int. Cl.
*H01M 4/02*    (2006.01)

(52) U.S. Cl. ............. 429/529; 429/524; 429/525; 429/526; 429/527; 429/530

(58) Field of Classification Search ............. 429/41, 429/524–527, 529, 530; 502/326
See application file for complete search history.

(56) References Cited

FOREIGN PATENT DOCUMENTS

| KR | 20070098238 A1 | 10/2007 |
| KR | 1020070098238 | * 10/2007 |
| WO | 2007/064942 A1 | 6/2007 |

OTHER PUBLICATIONS

Korean Office Action issued on Dec. 31, 2009, corresponding to the Korean Patent Application No. 10-2007-0105129.
Cited in Korean Office action dated Jun. 4, 2009 of Priority Application KR2007-0105129. "Electrodeposited PtRu on cryogel carbon-Nafion supports for DMFC anodes" by Arbizzani, et al., available online Jun. 23, 2006 at www.sciencedirect.com.

* cited by examiner

*Primary Examiner*—Patrick Ryan
*Assistant Examiner*—Thomas H. Parsons
(74) *Attorney, Agent, or Firm*—Robert E. Bushnell, Esq.

(57) ABSTRACT

The present invention provides a carrier for a fuel cell including a cryogel-type carbon. A catalyst of the fuel cell includes the cryogel-type carbon and an active material. One of an anode and cathode of the fuel cell has the catalyst including cryogel-type carbon. The carrier for a fuel cell has excellent porosity, specific surface area, and density characteristics, and thus is capable of improving catalyst activity due to excellent catalyst-supporting efficiency, and thereby cell performance.

16 Claims, 3 Drawing Sheets

CARRIER FOR FUEL CELL, AND CATALYST, MEMBRANE-ELECTRODE ASSEMBLY, AND FUEL CELL SYSTEM INCLUDING THE SAME

CLAIM OF PRIORITY

This application makes reference to, incorporates the same herein, and claims all benefits accruing under 35 U.S.C. §119 from an application earlier filed in the Korean Intellectual Property Office on 18 Oct. 2007 and there duly assigned Serial No. 10-2007-0105129.

BACKGROUND OF THE INVENTION

1. Field of the Invention

The present invention relates to a carrier for a fuel cell, and a fuel cell catalyst, a membrane-electrode assembly, and a fuel cell system including the same. More particularly, the present invention relates to a carrier for a fuel call having excellent porosity, specific surface area, and density characteristic, and thus being capable of improving catalyst activity due to the excellent catalyst-supporting efficiency and accordingly enhancing cell performance, and a fuel cell catalyst, a membrane-electrode assembly, and a fuel cell system, which all include the same.

2. Description of the Related Art

A fuel cell is a power generation system for producing electrical energy through an electrochemical redox reaction of an oxidant and a fuel such as hydrogen or a hydrocarbon-based material such as methanol, ethanol, natural gas, and the like. Such a fuel cell is a clean energy source that can replace fossil fuels. It includes a stack composed of unit cells and produces various ranges of power output. Since it has a four to ten times higher energy density than a small lithium battery, it has been highlighted as a small portable power source.

Representative exemplary fuel cells include a polymer electrolyte membrane fuel cell (PEMFC) and a direct oxidation fuel cell (DOFC). The direct oxidation fuel cell includes a direct methanol fuel cell that uses methanol as a fuel.

The polymer electrolyte fuel cell has an advantage of high energy density but also has problems in the need to carefully handle hydrogen gas and in the requirement of accessory facilities such as a fuel reforming processor for reforming methane or methanol, natural gas, and the like in order to produce hydrogen as a fuel gas.

On the contrary, a direct oxidation fuel cell has a lower energy density than the polymer electrolyte fuel cell but has the advantages of easy handling of a fuel, being capable of operating at room temperature due to its low operation temperature characteristic, and no need for an additional fuel reforming processor.

In the above fuel cell, the stack that generates electricity substantially includes several to scores of unit cells stacked in multi-layers. Each unit cell is formed of a membrane-electrode assembly (MEA) and a separator (also referred to as a bipolar plate). The membrane-electrode assembly has an anode (also referred to as a fuel electrode or an oxidation electrode) and a cathode (also referred to as an air electrode or a reduction electrode) attached to each other with an electrolyte membrane between them.

A fuel is supplied to the anode and adsorbed on an anode catalyst therein and oxidized to produce protons and electrons. The electrons are transferred into the cathode via an external circuit, while the protons are transferred into the cathode through the polymer electrolyte membrane. In addition, an oxidant is supplied to the cathode. Then, the oxidant, protons, and electrons are reacted on a cathode catalyst to produce electricity along with water.

SUMMARY OF THE INVENTION

One embodiment of the present invention provides a carrier for a fuel cell having excellent porosity, specific surface area, and density characteristic, and thus being capable of improving catalyst activity due to the excellent catalyst-supporting efficiency and accordingly improving cell performance.

Another embodiment of the present invention provides a fuel cell catalyst including the carrier.

Yet another embodiment of the present invention provides a membrane-electrode assembly and a fuel cell system including the catalyst.

According to one embodiment of the present invention, provided is a carrier for a fuel cell that includes a cryogel carbon.

According to another embodiment of the present invention, provided is a catalyst including an active material, and the carrier supporting the active material. The carrier includes a cryogel carbon. The carrier may include pores having an average pore diameter of 10 nm to 20 nm. The carrier may have a specific surface area ranging from 600 $m^2/g$ to 2000 $m^2/g$. The carrier may have a density ranging from 0.5 $g/cm^3$ to 1 $g/cm^3$.

According to yet another embodiment of the present invention, provided is a membrane-electrode assembly for a fuel cell including an anode and a cathode facing each other and a polymer electrolyte membrane interposed therebetween. At least one of the anode and the cathode includes the catalyst.

According to yet another embodiment of the present invention, provided is a fuel cell system that includes an electricity generating element, which includes a membrane-electrode assembly and a separator positioned at each side of the membrane-electrode assembly, a fuel supplier that supplies the electricity generating element with a fuel, and an oxidant supplier that supplies the electricity generating element with an oxidant. The membrane-electrode assembly for the fuel cell includes an anode and a cathode facing each other and a polymer electrolyte membrane interposed therebetween. At least one of the anode and the cathode includes the catalyst.

The carrier for a fuel has excellent porosity, specific surface area, and density characteristic, and thus is capable of improving catalyst activity due to the excellent catalyst-supporting efficiency and accordingly improving cell performance.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
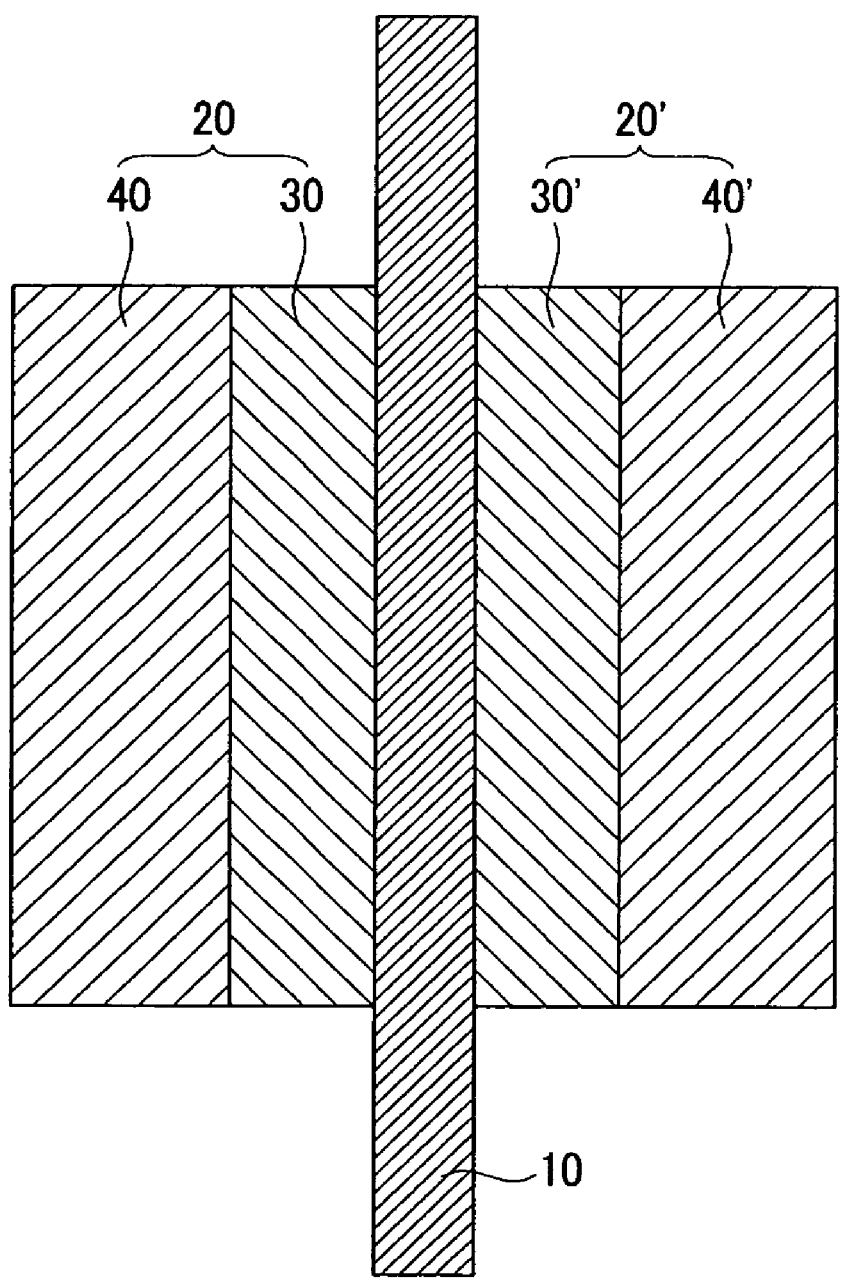
FIG. 1 is a schematic cross-sectional view showing a membrane-electrode assembly according to an embodiment of the present invention.

A fuel cell is a power generation system for generating electrical energy through oxidation of a fuel and reduction of an oxidant. The oxidation of a fuel occurs at an anode, while the reduction of an oxidant occurs at a cathode.

Both of the anode and the cathode include a catalyst layer that includes a catalyst to promote the oxidation of a fuel or the reduction of an oxidant. The anode catalyst layer representatively includes platinum-ruthenium, while the cathode catalyst layer may include platinum.

In general, a catalyst is supported on a carbon-based material or an inorganic particulate with pores in order to enlarge a reaction area. A carbon carrier has pores with an average pore diameter of several nanometers. When a carrier has larger pores, it may more easily transfer mass and can provide a larger surface area. As a result, it can improve dispersibility of an active material. Accordingly, research on improvement of pore size of a carrier has been performed.

For example, an aerogel-type carrier has been reported (Fuel Cells Bulletin, Volume 2006, Issue 4, April 2006, Page 6). In general, an aerogel is prepared by drying a wet gel through sol-gel reaction under supercriticalness in order to remove liquid inside a sol-gel. This aerogel has some features of a higher specific surface area and porosity but a lower density than a xerogel prepared in a common heating method to remove liquid within a gel. Accordingly, an aerogel carrier has a relatively large pore diameter ranging from 20 to 200 nm, and can thereby contribute more to improvement of fuel cell performance than a common carrier, except for the cost. However, since the aerogel carrier has large porosity, it has very small density. Accordingly, it has a limit of being loaded in a large amount to support an active material, when it is applied to fabricate a membrane-electrode assembly for a fuel cell. In addition, since it is prepared through supercritical drying, it may have a complex manufacturing process and thus cannot be mass produced.

Therefore, the present invention provides a cryogel carbon with a pore size between that of xerogel and aerogel as a carrier for a fuel cell. It has excellent catalyst-supporting efficiency due to excellent porosity and density characteristics, and thereby can improve catalyst activity. Accordingly, when it is applied to a fuel cell, it can improve cell performance. In addition, it can not only be easily fabricated, but can also be mass produced. In other words, one embodiment of the present invention provides a carrier for a fuel cell including a cryogel carbon.

In general, a cryogel is prepared in a lyophilization method, in which a solvent inside the gel is frozen into a solid under vacuum and then sublimated and dried. The cryogel has a smaller pore diameter and lower porosity than an aerogel, but a larger pore diameter and higher porosity than a xerogel. Accordingly, it can provide a larger specific surface area than a xerogel and a higher density than an aerogel, so that it can support an active material in an increased amount.

Specifically, according to one embodiment of the present invention, a cryogel-type carrier has pores with an average pore diameter ranging from 10 to 20 nm. In another embodiment, it has pores with an average pore diameter ranging from 10 to 15 nm. When the carrier has pores with an average diameter of less than 10 nm, it may not smoothly transfer mass. When it has pores with an average diameter of more than 20 nm, it cannot be increased in loading amount due to the increased volume.

In addition, the carrier may have a specific surface area ranging from 600 to 2000 $m^2/g$. In another embodiment of the present invention, it may have a specific surface area ranging from 800 to 1200 $m^2/g$. When it has a specific surface area of less than 600 $m^2/g$, it may lower dispersibility of an active material supported on a carrier. When it has a specific surface area of more than 2000 $m^2/g$, it may have decreased pores.

The carrier may have a density ranging from 0.5 to 1 $g/cm^3$. In another embodiment, it may have a density ranging 0.6 to 0.8 $g/cm^3$. When it has a density of less than 0.5 $g/cm^3$, it may hardly increase an amount of support active material. When it has a density of 1 $g/cm^3$, it may decrease porosity.

According to another embodiment of present invention, the cryogel-type carrier can be prepared in a method including preparing a wet gel by using a carbon precursor in a sol-gel method, lyophilizing the wet gel, and carbonizing the lyophilized gel. The carbon precursor may include resorcinol, formaldehyde, and the like.

The method of preparing a wet gel by using a carbon precursor in a sol-gel method is a well-known substitution method in the related field, and detailed illustrations are omitted herein.

Next, the wet gel prepared in a sol-gel method is lyophilized. The lyophilization may be performed at a temperature ranging from $-5$ to $-40°$ C. In another embodiment, it may be performed at a temperature ranging from $-10$ to $-30°$ C. In the case that the temperature is lower than $-40°$ C., it is practically difficult to decrease a temperature below $-40°$ C. When it is higher than $-5°$ C., the wet gel may be inappropriately sublimated.

Then, the lyophilized gel is carbonized to prepare a carrier including a cryogel carbon. The carbonization may be performed at a temperature ranging from 800 to $2000°$ C. In another embodiment, it may be performed at a temperature ranging from 1000 to $1500°$ C. When it is performed at a temperature of lower than $800°$ C., the carbonization may not occur. When it is performed at a temperature of higher than $2000°$ C., it may cause a carrier to have a decreased surface area and pores.

Since a cryogel carbon carrier prepared in the aforementioned method has appropriate porosity and density, it can provide a large reaction area and support an active material in a greater amount, improving cell performance.

According to another embodiment of the present invention, the present invention provides a catalyst for a fuel cell including the carrier. In other words, the catalyst includes an active material and a carrier supporting the active material. The carrier is the same as aforementioned.

The active material may include any catalyst that can participate in reaction of a fuel cell, and may representatively include a platinum-based material. The platinum-based material includes platinum, ruthenium, osmium, a platinum-ruthenium alloy, a platinum-osmium alloy, a platinum-palladium alloy, a platinum-M alloy where M is a transition element selected from the group consisting of Ga, Ti, V, Cr, Mn, Fe, Co, Ni, Cu, Zn, Sn, Mo, W, Rh, and Ru, and combinations thereof. Specific examples of the platinum-based material include at least one selected from the group consisting of Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, Pt/Ru/Sn/W, and combinations thereof.

In addition, when the catalyst is used as a cathode catalyst, the active material may include a Ru-Ch-containing compound (wherein, in the above formula, Ch is a chalcogen element selected from the group consisting of S, Se, Te, and combinations thereof).

Since the ruthenium (Ru) has an active site with high surface energy on the surface, an oxidant may easily have a reduction reaction on the ruthenium surface. Accordingly, since metals not in the platinum group can have relatively high catalyst activity for reduction of an oxidant, and also electric and ion conductivity, they have excellent selectivity and stability for the reduction of an oxidant. However, Ru has a problem of easily absorbing oxygen in the air. The absorbed oxygen blocks an active center where reduction of an oxidant occurs and causes problems in the reduction reaction.

The Ch is a chalcogen element selected from the group consisting of S, Se, Te, and combinations thereof. It prevents oxygen in the air from joining Ru and plays a role of promoting catalyst activity of Ru for reduction of an oxidant. In addition, the chalcogen element belongs to the same group as oxygen in the periodic table and has similar properties to oxygen. Accordingly, it has excellent selectivity for oxygen reduction. In other words, when an active material including the chalcogen element is applied to a reduction electrode as a catalyst, the chalcogen element promotes reduction of oxygen and suppresses oxidation of a fuel, improving cell performance. In particular, Se and Te among the chalcogen elements have a large atomic weight. When a catalyst including an active material including Se or Te is used for a direct oxidation fuel cell, Se or Te can efficiently prevent a crossover of fuel such as methanol and the like from permeating into the inside of the catalyst and poisoning it.

The active material may include Ru and Ch in a mole ratio ranging from 80:20 to 95:5. In another embodiment, it may include Ru and Ch in a mole ratio ranging from 90:10 to 95:5. When Ch is included at extremely less than Ru, beyond the range, it cannot block methanol and catalyst activity may deteriorate. On the contrary, when Ch is included at extremely more than Ru, it cannot smoothly release water as a product and oxygen as a reaction material, resultantly causing catalyst activity to deteriorate. In addition, the Ch may cause electrical conductivity to deteriorate, and thereby cell performance deteriorates.

The active material including a Ru-Ch-containing compound may further include a transition element selected from the group consisting of Ga, Ti, V, Cr, Mn, Fe, Co, Ni, Cu, Zn, Sn, Mo, W, Rh, and combinations thereof According to the embodiment of the present invention, a catalyst including the active material and the carrier has excellent activity and selectivity for reduction of an oxidant, and therefore can be most effectively applied to a direct methanol fuel cell (DMFC).

In addition, the catalyst for a fuel cell can be used for both a cathode and an anode. However, when the active material is a Ru-Ch-containing compound, it would be better to use the catalyst for a cathode.

The catalyst may further include an inorganic particulate such as $SiO_2$, $TiO_2$, $Al_2O_3$, $ZrO_2$, and the like, as well as a cryogel carrier.

According to another embodiment of the present invention, the present invention provides a membrane-electrode assembly for a fuel cell including an anode and a cathode facing each other, and a polymer electrolyte membrane positioned between the anode and the cathode. At least one of the anode and the cathode includes the catalyst.

FIG. 1 is a schematic cross-sectional view showing a membrane-electrode assembly according to the embodiment of the present invention. Referring to FIG. 1, the membrane-electrode assembly 151 includes a cathode 20 and an anode 20' facing each other, and a polymer electrolyte membrane 10 positioned between the cathode 20 and the anode 20'. The cathode 20 and the anode 20' respectively include electrode substrates 40 and 40' and catalyst layers 30 and 30'. The electrode substrates 40 and 40' of the cathode 20 and anode 20' provide a path for transferring reactants such as a fuel and an oxidant to the catalyst layers 30 and 30'.

In one embodiment, the electrode substrates 40 and 40' are formed of a conductive substrate such as carbon paper, carbon cloth, carbon felt, or a metal cloth (a porous film composed of metal fiber or a metal film disposed on the surface of a cloth composed of polymer fibers). The electrode substrates, however, are not limited thereto.

The electrode substrates 40 and 40' may be treated with a fluorine-based resin to be water-repellent to prevent deterioration of diffusion efficiency due to water generated during operation of a fuel cell. The fluorine-based resin may include polytetrafluoroethylene, polyvinylidene fluoride, polyhexafluoro propylene, polyperfluoroalkylvinylether, polyperfluoro sulfonylfluoride alkoxyvinyl ether, fluorinated ethylene propylene, polychlorotrifluoro ethylene, copolymers thereof, or mixtures thereof, but is not limited thereto.

The catalyst layers 30 and 30' are positioned on the electrode substrates 40 and 40'. The catalyst layers 30 and 30' include a catalyst, and facilitate oxidation of a fuel and reduction of an oxidant. The catalysts, included in the anode and cathode, are the same as described above.

The catalyst layers 30 and 30' may further include a binder resin in order to improve adherence and proton conductivity. The binder resin may be any proton-conductive polymer. Non-limiting examples of the binder include polymer resins having a cation exchange group selected from the group consisting of a sulfonic acid group, a carboxylic acid group, a phosphoric acid group, a phosphonic acid group, and derivatives thereof at its side chain. Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers polysulfone-based polymers, polyethersulfone-based polymers, polyetherketone-based polymers, polyether-etherketone-based polymers, polyphenylquinoxaline-based polymers, copolymers thereof, and mixtures thereof.

In one embodiment, the proton conductive polymer is at least one selected from the group consisting of poly(perfluorosulfonic acid), poly(perfluorocarboxylic acid), a copolymer of tetrafluoroethylene and fluorovinylether having a sulfonic acid group, defluorinated polyetherketone sulfide, aryl ketone, poly(2,2'-(m-phenylene)-5,5'-bibenzimidazole), or poly(2,5-benzimidazole).

The binder resins may be used by itself or in combination. They may be used along with non-conductive polymers to improve adherence to a polymer electrolyte membrane. The binder resins maybe used in a controlled amount adapted to their purposes. Non-limiting examples of the non-conductive polymers include polytetrafluoroethylene (PTFE), tetrafluoroethylene-hexafluoropropylene copolymers (FEP), tetrafluoroethylene-perfluoro alkyl vinylether copolymers (PFA), ethylene/tetrafluoroethylene (ETFE), chlorotrifluoroethylene-ethylene copolymers (ECTFE), polyvinylidenefluoride, polyvinylidenefluoride-hexafluoropropylene copolymers (PVdF-HFP), dodecylbenzenesulfonic acid, sorbitol, and combinations thereof.

The membrane-electrode assembly 151 may further include a microporous layer (MPL, not shown) to increase reactant diffusion effects in the aforementioned electrode substrates 40 and 40'. The microporous layer generally includes conductive powders with a particular particle diameter. The conductive material may include, but is not limited to, carbon powder, carbon black, acetylene black, activated carbon, carbon fiber, fullerene, nano-carbon, or combinations thereof. The nano-carbon may include a material such as carbon nanotubes, carbon nanofiber, carbon nanowire, carbon nanohoms, carbon nanorings, or combinations thereof.

The microporous layer is formed by coating the electrode substrate with a composition including a conductive powder, a binder resin, and a solvent. The binder resin may include, but is not limited to, polytetrafluoroethylene, polyvinylidene fluoride, polyhexafluoro propylene, polyperfluoroalkylvinylether, polyperfluoro sulfonylfluoride alkoxyvinyl ether, polyvinyl alcohol, cellulose acetate, or copolymers thereof. The solvent may include, but is not limited to, an alcohol such as ethanol, isopropyl alcohol, n-propyl alcohol, butanol, and so on, water, dimethyl acetamide, dimethyl sulfoxide, N-methylpyrrolidone, and tetrahydrofuran. The coating method may include, but is not limited to, screen printing, spray coating, doctor blade methods, gravure coating, dip coating, silk screening, painting, and so on, depending on the viscosity of the composition.

A polymer electrolyte membrane 10 is disposed between the anode 20' and the cathode 20. The polymer electrolyte membrane 10 plays a role of exchanging ions by transferring protons produced on the catalyst layer 30' of an anode 20' to the catalyst layer 30 of a cathode 20. The proton conductive polymer for the polymer electrolyte membrane of the present invention may be any polymer resin having a cation exchange group selected from the group consisting of a sulfonic acid group, a carboxylic acid group, a phosphoric acid group, a phosphonic acid group, and derivatives thereof at its side chain. Non-limiting examples of the polymer resin include at least one proton conductive polymer selected from the group consisting of fluoro-based polymers, benzimidazole-based polymers, polyimide-based polymers, polyetherimide-based polymers, polyphenylenesulfide-based polymers, polysulfone-based polymers, polyethersulfone-based polymers, polyetherketone-based polymers, polyether-etherketone-based polymers, and polyphenylquinoxaline-based polymers. In one embodiment, the proton conductive polymer is at least one selected from the group consisting of poly(perfluorosulfonic acid) (commercially available as Nafion), poly(perfluorocarboxylic acid, a copolymer of tetrafluoroethylene and fluorovinylether having a sulfonic acid group, defluorinated polyetherketone sulfide, aryl ketone, poly(2,2'-(m-phenylene)-5,5'-bibenzimidazole), poly(2,5-benzimidazole), copolymers thereof, and mixtures thereof.

H can be replaced with Na, K, Li, Cs, or tetrabutylammonium in a proton conductive group of the proton conductive polymer. When the H is substituted by Na in an ion exchange group at the terminal end of the proton conductive group, NaOH is used. When the H is replaced with tetrabutylammonium, tributylammonium hydroxide is used. K, Li, or Cs can also be replaced by using appropriate compounds. A method of substituting Na, K, Li, Cs, or tetrabutylammonium for H is known in this related art, and is thereby not further described in detail.

According to another embodiment of the present invention, a fuel cell system including the above membrane-electrode assembly is provided. A fuel cell system of the present invention includes at least one of an electricity generating element, a fuel supplier, and an oxidant supplier.

The electricity generating element includes a membrane-electrode assembly, and separators positioned at both sides of the membrane-electrode assembly. It generates electricity through oxidation of a fuel and reduction of an oxidant. The fuel supplier plays a role of supplying the electricity generating element with a fuel including hydrogen, and the oxidant supplier plays a role of supplying the electricity generating element with an oxidant. The fuel includes liquid or gaseous hydrogen, or a hydrocarbon-based fuel such as methanol, ethanol, propanol, butanol, or natural gas. The oxidant includes oxygen or air. The fuel and oxidant are not limited to the above.

Figure 2:
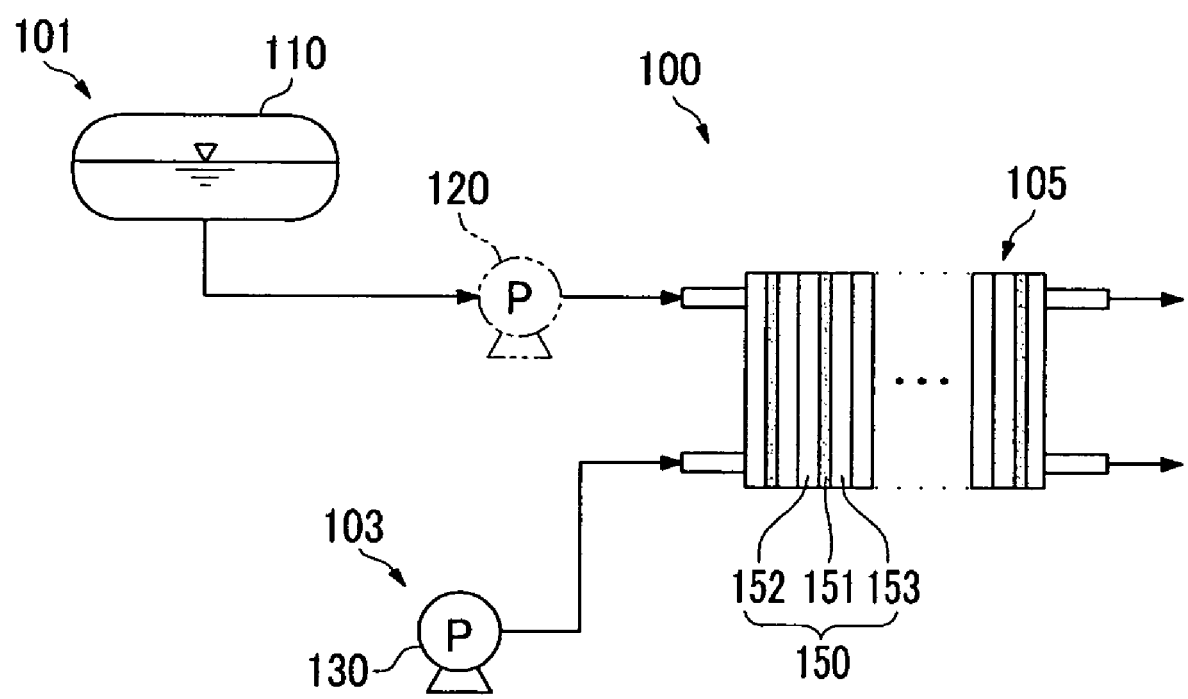
FIG. 2 is a schematic diagram showing the structure of a fuel cell system according to another embodiment of the present invention.

FIG. 2 shows a schematic structure of a fuel cell system 100 that will be described in detail with reference to this accompanying drawing, as follows. FIG. 2 illustrates a fuel cell system wherein a fuel and an oxidant are provided to an electricity generating element 150 through pumps 120 and 130, but the present invention is not limited to such structures. The fuel cell system of the present invention may alternatively include a structure for providing a fuel and an oxidant in a diffusion manner.

A fuel cell system 100 includes at least one electricity generating element 150 that generates electrical energy through electrochemical reaction of a fuel and an oxidant, a fuel supplier 101 for supplying a fuel to the electricity generating element 150, and an oxidant supplier 103 for supplying an oxidant to the electricity generating element 150. In addition, the fuel supplier 101 is equipped with a tank 110 storing a fuel, and a pump 120 connected thereto. The fuel pump 120 supplies a fuel stored in the tank 110 with a predetermined pumping power. The oxidant supplier 103, which supplies the electricity generating element 150 with an oxidant, is equipped with at least one pump 130 for supplying an oxidant with a predetermined pumping power.

The electricity generating element 150 includes a membrane-electrode assembly 151 that oxidizes hydrogen or a fuel and reduces an oxidant, and separators 152 and 153 that are respectively positioned at both sides of the membrane-electrode assembly and supply hydrogen or a fuel, and an oxidant, respectively. Such electricity generating elements 150 are stacked to constitute a stack 105.

The following examples illustrate the present invention in more detail. However, it is understood that the present invention is not limited by these examples.

EXAMPLE 1

2.9 g of 2,4-dihydroxybenzoic acid was added to 100 cc of distilled water. Then, 1.29 g of $K_2CO_3$ was added to the mixture while agitating it to prepare a mixed solution. When the mixed solution became clear, 2.98 g of formaldehyde was added thereto, and then 26 mg of $K_2CO_3$ was also added. The resulting solution was maintained at room temperature for 24 hours and then at 80° C. for 48 hours, gaining a gel. The gel was lyophilized and then carbonized at 1000° C. for 4 hours, preparing a cryogel-type carbon carrier.

COMPARATIVE EXAMPLE 1

A commercially available xerogel-type carbon (Vulcan Co.) was used as a carrier. The carbon carriers according to Example 1 and Comparative Example 1 were evaluated to measure average pore diameters, specific surface areas, and densities by using a BET surface area and porosimetry analyzer. The results are shown in the following Table 1.

TABLE 1

|  | Example 1 | Comparative Example 1 |
| --- | --- | --- |
| Average pore diameter (nm) | 15.2 | 8.3 |
| Specific surface area ($m_2$/g) | 1230 | 230 |
| Density (g/cm$_3$) | 0.78 | 2.2 |

As shown in Table 1, the cryogel carbon of Example 1 had a larger average pore diameter and specific surface area but lower density than the xerogel carbon of Comparative Example 1. Accordingly, the cryogel of Example 1 can support more active material than the xerogel of Comparative Example 1, and can thereby have much better catalyst activity.

EXAMPLE 2

2.9 g of 2,4-dihydroxybenzoic acid was added to 100 cc of distilled water. Then, 1.29 g of $K_2CO_3$ was added to the mixture while agitating it, preparing a mixed solution. When the mixed solution became clear, 2.98 g of formaldehyde was added thereto, and then 26 mg of $K_2CO_3$ was added. The resulting solution was maintained at room temperature for 24 hours and then at 80° C. for 48 hours, gaining a gel. The gel was dipped in 0.1 M of a $Ru(NO_3)_2$ solution to substitute Ru for K. After the substitution, the resulting gel was lyophilized, gaining a powder. The powder was carbonized at 1000° C. for 4 hours, preparing a cryogel carbon (Ru/C) supported on Ru.

Then, 0.075 g of $H_2SeO_3$ was dissolved in 3 ml of acetone. The solution was supported on the prepared Ru/C. The resulting product was dried at 70° C. for 24 hours and then dried at 140° C. under vacuum for 4 hours. The dried product was heat-treated at 300° C. for 4 hours under a mixed gas atmosphere of $H_2$ and $N_2$ in a 1:1 volume ratio, preparing a RuSe/C catalyst.

EXAMPLE 3

2.9 g of 2,4-dihydroxybenzoic acid was added to 100 cc of distilled water, and then 1.29 g of $K_2CO_3$ was added thereto while agitating it, preparing a mixed solution. When the mixed solution became clear, 2.98 g of formaldehyde was added thereto, and thereafter 26 mg of $K_2CO_3$ was also added. The resulting solution was maintained at room temperature for 24 hours and then at 80° C. for 48 hours, preparing a gel. The gel was dipped in 0.1 M of a $Ru(NO_3)_2$ solution to substitute Ru for K. Then, the substituted gel was lyophilized, gaining a powder. The powder was carbonized at 1000° C. for 4 hours, preparing a cryogel carbon (Ru/C) supported on a carrier.

Next, 0.075 g of $H_2SeO_3$ and 0.05 g of $CoCl_3$ were dissolved in 3 ml of acetone. The solution was supported on the above Ru/C. The acquired product was primarily dried at 70° C. for 24 hours, and then at 140° C. under vacuum for 4 hours. The dried product was heat-treated at 300° C. for 4 hours under a gas atmosphere of $H_2$ and $N_2$ in a volume ratio of 1:1, preparing a RuSeCo/C catalyst.

COMPARATIVE EXAMPLE 2

1 g of $RuCl_3$ hydrate was dissolved in 2 ml of acetone. The solution was supported on 1 g of a xerogel carbon carrier (Vulcan Co.). The resulting product was dried at 70° C. under normal pressure for 24 hours and then at 140° C. under vacuum for 4 hours. The dried specimen was heat-treated at 300° C. for 4 hours under a gas atmosphere of $H_2$ and $N_2$ in a volume ratio of 1:1 to prepare Ru/C supported on xerogel carbon. Next, 0.075 g of $H_2SeO_3$ was dissolved in 3 ml of acetone. The solution was supported on the prepared Ru/C. The resulting product was dried at 70° C. for 24 hours and then at 140° C. under vacuum for 4 hours. The dried specimen was heat-treated under a gas atmosphere of $H_2$ and $N_2$ mixed in a volume ratio of 1:1 at 300° C. for 4 hours, preparing a RuSe/C catalyst.

The catalysts of Example 2 and Comparative Example 2 were examined to measure cyclic voltametry at 30° C. in a 0.5 M sulfuric acid solution. The results are provided in FIG. 3.

Figure 3:
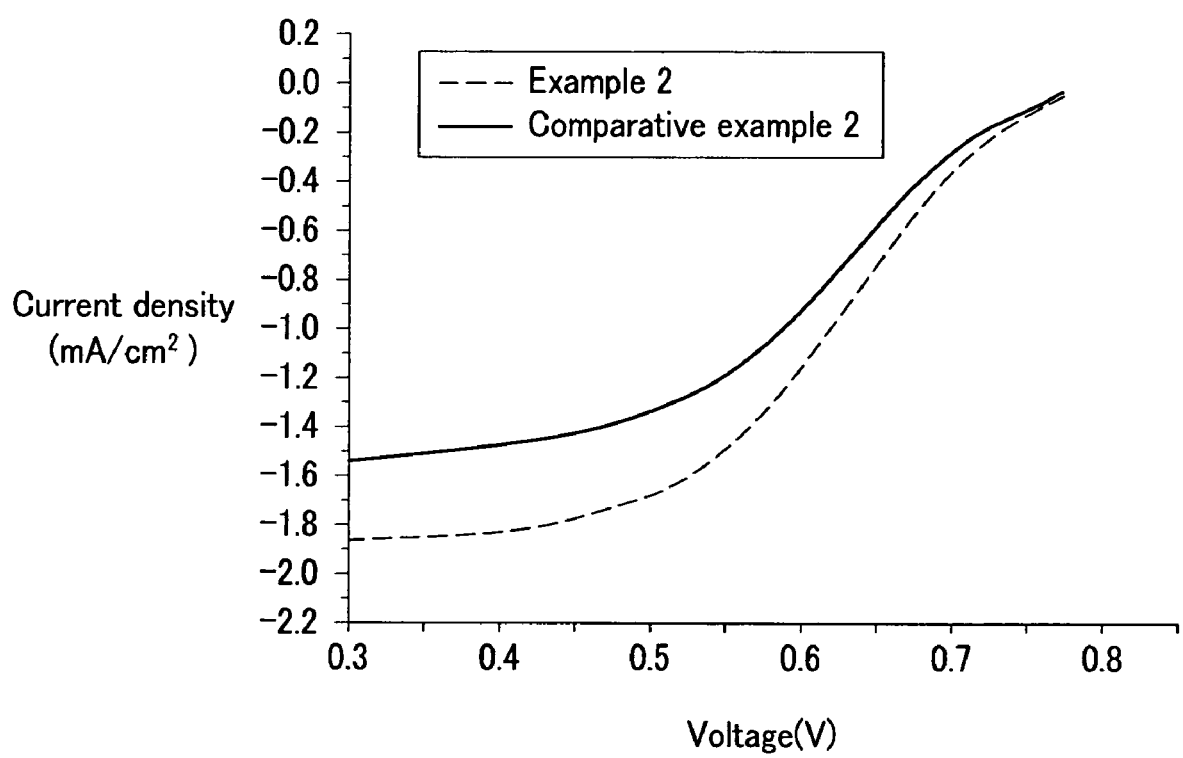
FIG. 3 shows cyclic voltammetry measurement results of the catalysts according to Example 2 and Comparative Example 2 of the present invention.

As shown in FIG. 3, the catalyst of Example 2 had higher methanol oxidation activity of 1.24 $mA/cm^2$ at 0.6 V than the 0.97 $mA/cm^2$ of the catalyst of Comparative Example 2. In addition, it had 24 to 50% higher catalyst activity for a methanol oxidation reaction within a voltage range of 0.5 V to 0.75 V than that of Comparative Example 2.

EXAMPLE 4

The catalyst of Example 2 was placed in a solvent of water and isopropyl alcohol, which are mixed in a volume ratio of 10:80. Next, 25% weight of a Nafion solution (Nafion 1100 EW, DuPont Co.) was added to the mixed solution. Then, ultrasonic waves were applied to the resulting solution while uniformly agitating it, preparing a composition for forming a catalyst layer.

The composition for forming a catalyst layer was sprayed for coating a carbon paper substrate (cathode/anode=SGL 31BC/10DA; SGL carbon group products) treated with TEFLON (tetrafluoroethylene) to prepare a cathode. In addition, an anode was prepared in the same method as aforementioned by using a PtRu black catalyst (HiSPEC® 6000, Johnson Matthey Co.). Herein, as for the cathode, a catalyst was formed in a loading amount of 6 $mg/cm^2$, while as for the anode, a catalyst was formed in a loading amount of 4 $mg/cm^2$.

Next, a membrane-electrode assembly was prepared by laminating a commercial polymer electrolyte membrane for a fuel cell (Nafion 115 Membrane, DuPont Co.) on both sides of the electrode. The membrane-electrode assembly was inserted between gaskets and then between two separators having gas and cooling channels with a predetermined shape, and compressed between copper end plates to fabricate a single cell.

EXAMPLE 5

A single cell was fabricated according the same method as in Example 4, except for using the catalyst of Example 3.

COMPARATIVE EXAMPLE 3

A single cell was fabricated according to the same method as in Example 4, except for using the catalyst of Comparative Example 2.

The single cells according to Examples 4 and 5 and Comparative Example 3 were evaluated regarding output characteristics at 70° C. and 0.4 V. As a result, the single cells of Examples 4 and 5 were found to have a 30 to 50% improved output characteristic compared with that of Comparative Example 3.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A carrier for a cathode catalyst of a fuel cell comprising a cryogel carbon.

2. The carrier of claim 1, wherein the carrier comprises pores having an average pore diameter of 10 nm to 20 nm.

3. The carrier of claim 1, wherein the carrier has a specific surface area ranging from 600 $m^2/g$ to 2000 $m^2/g$.

4. The carrier of claim 3, wherein the carrier has a density ranging from 0.5 $g/cm^3$ to 1 $g/cm^3$.

5. A catalyst for a cathode of a fuel cell comprising:
an active material; and
a carrier supporting the active material, the carrier including a cryogel carbon.

6. The catalyst of claim 5, wherein the carrier has pores with an average pore diameter ranging from 10 nm to 20 nm.

7. The catalyst of claim 5, wherein the carrier has a specific surface area ranging from 600 $m^2/g$ to 2000 $m^2/g$.

8. The catalyst of claim 5, wherein the carrier has a density ranging from 0.5 $g/cm^3$ to 1 $g/cm^3$.

9. The catalyst of claim 5, wherein the active material is selected from the group consisting of platinum, ruthenium, osmium, a platinum-ruthenium alloy, a platinum-osmium alloy, a platinum-palladium alloy, a platinum-M alloy, and mixtures thereof, wherein M is a transition element selected from the group consisting of Ga, Ti, V, Cr, Mn, Fe, Co, Ni, Cu, Zn, S, Mo, W, Rh, and combinations thereof.

10. The catalyst of claim 5, wherein the active material includes a Ru-Ch-containing compound, wherein Ch is a chalcogen element selected from the group consisting of S, Se, Te, and combinations thereof.

11. The catalyst of claim 10, wherein the active material comprises Ru and Ch in a mole ratio of 80:20 to 95:5.

12. The catalyst of claim 5, wherein the active material further comprises a transition element selected from the group consisting of Ga, Ti, V, Cr, Mn, Fe, Co, Ni, Cu, Zn, Sn, Mo, W, Rh, and combinations thereof.

13. The catalyst of claim 5, wherein the catalyst is a catalyst for a direct oxidation fuel cell.

14. A membrane-electrode assembly for a fuel cell, comprising:
an anode and a cathode facing each other, the cathode comprising a catalyst that comprises:
an active material; and
a carrier supporting the active material, the carrier including a cryogel carbon; and
a polymer electrolyte membrane interposed between the anode and the cathode.

15. A fuel cell system comprising:
an electricity generating element comprising:
a membrane-electrode assembly comprising:
an anode and a cathode facing each other, the cathode comprising a catalyst that comprises:
an active material; and
a carrier supporting the active material, the carrier including a cryogel carbon; and
a polymer electrolyte membrane interposed between the anode and cathode; and
separators disposed on each side of the membrane-electrode assembly;
a fuel supplier for supplying the electricity generating element with a fuel; and
an oxidant supplier for supplying the electricity generating element with an oxidant.

16. The fuel cell system of claim 15, wherein the fuel cell system includes a direct oxidation fuel cell.

* * * * *